United States Patent
Wong et al.

(10) Patent No.: US 8,996,928 B2
(45) Date of Patent: Mar. 31, 2015

(54) DEVICES FOR INDICATING A PHYSICAL LAYER ERROR

(75) Inventors: Mong Chit Wong, San Diego, CA (US); Stephen Thomas Baker, Encinitas, CA (US); Kim Hock Tham, San Diego, CA (US); Xuanning Gao, San Diego, CA (US); Mohammad Rahman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 13/613,512

(22) Filed: Sep. 13, 2012

(65) Prior Publication Data

US 2013/0275811 A1    Oct. 17, 2013

Related U.S. Application Data

(60) Provisional application No. 61/625,224, filed on Apr. 17, 2012.

(51) Int. Cl.
*G06F 11/00*    (2006.01)
*G06F 11/07*    (2006.01)
*G06F 11/22*    (2006.01)

(52) U.S. Cl.
CPC .......... *G06F 11/079* (2013.01); *G06F 11/2268* (2013.01)
USPC .......................................................... 714/56

(58) Field of Classification Search
CPC ............ G06F 11/2089; H04L 12/2697; H04L 49/555
See application file for complete search history.

(56) References Cited

U.S. PATENT DOCUMENTS

| | | | |
|---|---|---|---|
| 6,298,458 B1 * | 10/2001 | Cranford et al. | 714/716 |
| 6,385,738 B1 * | 5/2002 | Lo | 714/25 |
| 7,152,190 B2 | 12/2006 | Overtoom | |
| 7,231,558 B2 * | 6/2007 | Gentieu et al. | 714/704 |
| 7,260,748 B2 * | 8/2007 | Wong et al. | 714/43 |
| 7,272,114 B1 * | 9/2007 | Barkan | 370/248 |
| 7,502,327 B2 * | 3/2009 | Burns et al. | 370/241 |
| 7,643,546 B2 * | 1/2010 | Chen et al. | 375/224 |
| 7,701,861 B1 * | 4/2010 | Barkan | 370/248 |
| 8,228,946 B2 * | 7/2012 | Hao et al. | 370/469 |
| 8,260,285 B2 * | 9/2012 | Anderton | 455/423 |
| 2004/0078717 A1 * | 4/2004 | Allred et al. | 714/43 |
| 2004/0215421 A1 | 10/2004 | Schmitz et al. | |
| 2005/0097403 A1 | 5/2005 | Chen | |
| 2005/0175079 A1 * | 8/2005 | Gamper et al. | 375/228 |

(Continued)

OTHER PUBLICATIONS

International Search Report and Written Opinion—PCT/US2013/037016—ISA/EPO—Sep. 24, 2013.

(Continued)

*Primary Examiner* — Christopher McCarthy

(57) ABSTRACT

A computing device for indicating a physical layer error is described. The computing device includes a processor and instructions stored in memory that is in electronic communication with the processor. The computing device generates a command for a testing device. The command includes a directive to capture at least one physical layer signal corresponding to a communications interface between a first electronic device and a second electronic device. The computing device also obtains data representing the at least one physical layer signal. The computing device additionally stores the data in a storage device to obtain stored data. The stored data indicates any physical layer error.

44 Claims, 10 Drawing Sheets

(56) References Cited

U.S. PATENT DOCUMENTS

| | | | |
|---|---|---|---|
| 2005/0183066 A1 | 8/2005 | Jabori | |
| 2008/0192814 A1* | 8/2008 | Hafed et al. | 375/224 |
| 2008/0310314 A1* | 12/2008 | Hof et al. | 370/242 |
| 2010/0002588 A1* | 1/2010 | Cantwell et al. | 370/241 |
| 2011/0040516 A1 | 2/2011 | Wang | |
| 2011/0173502 A1 | 7/2011 | Cao | |
| 2011/0255427 A1* | 10/2011 | Diab et al. | 370/252 |
| 2011/0264396 A1 | 10/2011 | Kitchener et al. | |
| 2014/0072296 A1* | 3/2014 | Montalvo Garcia et al. | 398/16 |

OTHER PUBLICATIONS

Compaq, et al., "Universal Serial Bus Specification Revision 2.0," Apr. 27, 2000, http://www.usb.org/developers/docs/, 650 pages.

MathWorks, Instrument Control Toolbox Product Description, Retrieved from http://www.mathworks.com/products/instrument/description1.html on Apr. 16, 2012.

* cited by examiner

DEVICES FOR INDICATING A PHYSICAL LAYER ERROR

CLAIM OF PRIORITY UNDER 35 U.S.C. 119

The present application for patent claims priority to Provisional Application No. 61/625,224, entitled "DEVICES FOR INDICATING A PHYSICAL LAYER ERROR" filed Apr. 17, 2012, and assigned to the assignee hereof and hereby expressly incorporated by reference herein.

TECHNICAL FIELD

The present disclosure relates generally to electronic devices. More specifically, the present disclosure relates to devices for indicating a physical layer error.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society.

In various situations, it may be desirable for electronic devices to communicate with each other. Communication between electronic devices may be beneficial. For example, communication between electronic devices may allow one electronic device to utilize the functionality of another electronic device. In many cases, a communications interface may be used for communication between one or more electronic devices.

The quality of the communications between two or more electronic devices depends on the ability of the two or more electronic devices to communicate over the communications interface. As can be observed from this discussion, systems and methods for improving debugging techniques may be beneficial.

SUMMARY

A computing device for indicating a physical layer error is described. The computing device includes a processor and instructions stored in memory that is in electronic communication with the processor. The instructions are executable to generate a command for a testing device. The command includes a directive to capture at least one physical layer signal corresponding to a communications interface between a first electronic device and a second electronic device. The instructions are also executable to obtain data representing the at least one physical layer signal. The instructions are further executable to store the data in a storage device to obtain stored data. The stored data indicates any physical layer error. The physical layer error may not be analyzable by analyzing any higher layers. The testing device may include an oscilloscope. The command may include a machine control command.

The instructions may also be executable to analyze the stored data for debugging at least one of the first electronic device and the second electronic device. The instructions may additionally be executable to display the stored data for visual analysis.

Obtaining data representing the at least one physical layer signal may include identifying one or more enabled channels for the testing device. Obtaining data representing the at least one physical layer signal may also include saving a channel legend to a string for each of the one or more enabled channels. Obtaining data representing the at least one physical layer signal may also include identifying a directory for saving data. Obtaining data representing the at least one physical layer signal may also include obtaining one or more parameters including at least one of scale and trigger level. Obtaining data representing the at least one physical layer signal may also include determining whether an end condition has occurred. If an end condition has occurred, then obtaining data representing the at least one physical layer signal may include ending. If an end condition has not occurred, then obtaining data representing the at least one physical layer signal may include saving channel data to a file if the testing device is in a stop state and setting the testing device to be in a run state if the testing device is in the stop state.

Displaying the stored data for visual analysis may include reading a directory with a plurality of files that contain the stored data. Displaying the stored data for visual analysis may also include displaying a plot based on the stored data. Displaying the stored data for visual analysis may additionally include generating a micro-view based on the plot. Displaying the stored data for visual analysis may also include displaying the micro-view.

The at least one physical layer signal may include an analog signal. The analog signal may be a real-time bit-level signal. The at least one physical layer signal may include at least one of the group consisting of a positive data signal (D+), a negative data signal (D−), a common collector voltage (VCC) and a clock signal (CLK).

The first electronic device may include a computer and the second electronic device may include a data modem. The communications interface may include a Universal Serial Bus interface.

A method for indicating a physical layer error on a computing device is also described. The method includes generating a command for a testing device. The command includes a directive to capture at least one physical layer signal corresponding to a communications interface between a first electronic device and a second electronic device. The method also includes obtaining data representing the at least one physical layer signal. The method additionally includes storing the data in a storage device to obtain stored data. The stored data indicates any physical layer error.

An apparatus for indicating a physical layer error is also described. The apparatus includes means for generating a command for a testing device. The command includes a directive to capture at least one physical layer signal corresponding to a communications interface between a first electronic device and a second electronic device. The apparatus also includes means for obtaining data representing the at least one physical layer signal. The apparatus additionally includes means for storing the data in a storage device to obtain stored data. The stored data indicates any physical layer error.

A computer-program product for indicating a physical layer error is also described. The computer-program product includes code for causing a computing device to generate a command for a testing device. The command includes a directive to capture at least one physical layer signal corresponding to a communications interface between a first electronic device and a second electronic device. The computer-program product also includes code for causing the computing device to obtain data representing the at least one physical layer signal. The computer-program product additionally includes code for causing the computing device to store the data in a storage device to obtain stored data. The stored data indicates any physical layer error.

DETAILED DESCRIPTION

Figure 1:
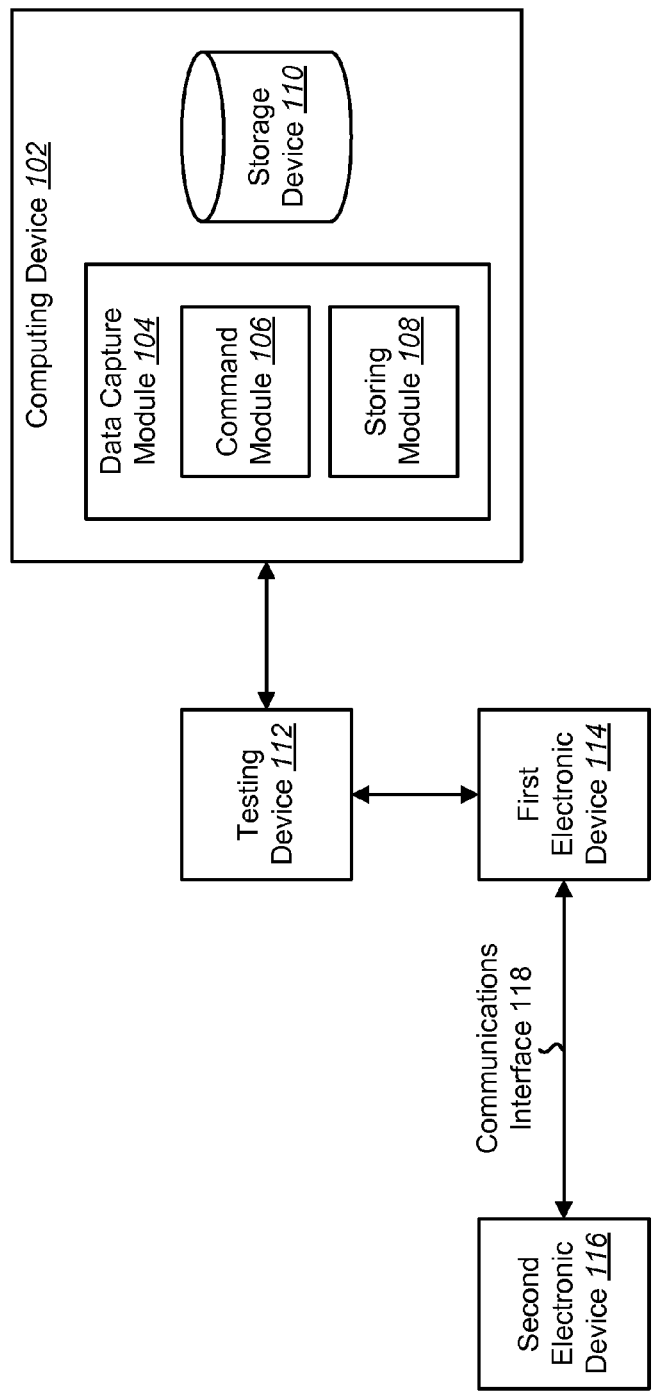
FIG. 1 is a block diagram illustrating one configuration of a computing device in which systems and methods for indicating a physical layer error may be implemented.

In some configurations, the systems and methods disclosed herein may be used for analyzing and debugging low level (at the physical (PHY) layer, for example) errors. As used herein, the term "physical layer" may correspond to any low level (e.g., board level, bit level, bus level, etc.) signals. For example, in one configuration, the physical layer may correspond to the fundamental signal (e.g., voltage level, current level, frequency level, wavelength, etc.) being transferred across a transportation medium (e.g., copper, semiconductor, glass, metal, air, etc.). In some configurations, the transportation medium may comprise an interface between a first electronic device and a second electronic device.

It is noted that in some cases, high level debuggers (e.g., software loggers, protocol analyzers, etc.) may not capture and/or indicate physical layer errors. Instead, high level debuggers may be used to provide high level analysis and debugging. Because high level debuggers are designed for analyzing the higher layers, they may be incapable of capturing and/or indicating low level errors (errors at the physical layer, for example). For example, a high level debugger may detect a protocol error that occurred in a higher layer, but may not be able to detect errant voltages at the physical layer. Identifying a physical layer error may be beneficial for debugging physical layer errors. For example, a physical layer logger may complement high level debuggers (software loggers and protocol analyzers, for example) by capturing and indicating physical layer errors.

In many cases, low level errors (e.g., errors at the physical layer) may be random and intermittent and relate to power management issues corresponding to the communications interface. Physical layer errors may result in a variety of problems. For example, physical layer errors on a Universal Serial Bus (USB) 2.0 interface (between various host platforms and a data card modem, for example) may cause call failures and/or device detection problems, etc. Because physical layer errors may be random and/or intermittent, it may take days for a single failure to occur.

A physical layer data logger may require large amounts of storage to capture lengthy time periods (e.g., hours, days, weeks, etc.) of physical layer data. However, testing devices (e.g., oscilloscopes, etc.) may have limited storage for captured data. It is noted that existing software level loggers and protocol analyzers may not track the root cause at the signal level, because they may be limited to higher level analysis (e.g., they may be unable to capture and/or indicate physical layer errors). These limitations (and others, for example) may prohibit existing logic analyzers or oscilloscopes from capturing random failure data at the physical layer.

In one example, the systems and methods disclosed herein may be used for detecting PHY layer errors in a Universal Serial Bus (USB) interface (e.g., USB 2.0, USB 3.0, etc.). For example, random and intermittent USB failures may occur between a first electronic device and a second electronic device coupled together with a USB interface. In some cases, it may be hours, days or weeks before a single failure occurs.

In some cases, the physical layer may enable communications for devices communicating across a communications interface. For example, glitches, calibration issues, errant signals and signal integrity issues may all cause errors at the physical layer. Examples of communications interfaces include Bluetooth, Peripheral Component Interconnect (PCI) Express, Institute of Electrical and Electronics Engineers (IEEE) 1394, Fibre Channel, USB, Wireless USB, Ethernet, etc.

In some configurations, the systems and methods described herein may be used for debugging a communications interface (e.g., USB) between a host (e.g., a personal computer (PC)) and a device (e.g., a mobile broadband modem). In many cases, the interface between two electronic devices may be internal. In some cases, one or more of the electronic devices (e.g., the mobile broadband modem) may be made accessible for testing (using a breakout board, for example) so that the communications interface is accessible for debugging.

In some configurations, the systems and methods disclosed herein may be directed to a data acquisition system that allows physical layer signals (from a device that is communicating over a USB interface, for example) to be saved on a generous external storage device. Saving the physical layer signals on an external storage device may allow the physical layer signals to be analyzed after an issue is caught. For example, physical layer signaling data may be captured and saved for offline analysis and visualization.

In one configuration, the systems and methods described herein may include a testing device for testing a device under test (DUT) and a computing device for controlling the testing device. The computing device (e.g., a personal computing device (PC)) with a large capacity hard disk may be loaded with executable instructions for automated machine control (using MATLAB, for example) of the testing device. The testing device may be an oscilloscope (Tektronix scope TDS7254, for example) or another device for capturing PHY level signals. A protocol analyzer (Lecroy Computer Access Technology Corporation (CATC) analyzer, for example) may be used for detecting and/or analyzing errors that are at a higher level and for debug correlation. A protocol analyzer may not be capable of analyzing physical layer errors. In one configuration, the DUT may be a modem for connecting to a cellular and/or wireless access point (GOBI platform, for example).

In one configuration, the systems and methods disclosed herein may be used for detecting physical layer errors in a USB interface. In this case, the data positive (D+) physical layer signal (e.g., positive data signal), the data minus (D−) physical layer signal (e.g., negative data signal), the common collector voltage (VCC) of the interface and the mobile station modem (MSM) clock (CLK) interfaces may be captured on the testing device (e.g., oscilloscope, Tektronix TDS7254) channels. In some configurations, each channel may be triggering based on specific parameters and/or conditions. The automation program on the computing device may transfer and save all of the captured physical layer signal data in real time. In one example, physical layer signal data may be captured and saved for weeks at a time as long as the computing device is provided with sufficient storage space. In some configurations, a separate, standalone graphical user interface (GUI) may be created to help analyze and visualize the saved data. It is noted that in some cases, the transfer rate may be improved by running the automation program on the testing device.

In some configurations, machine control languages (MATLAB Instrument Control Toolbox, for example) may be used to communicate with instruments such as oscilloscopes. Machine control instructions may be used for automated machine control, data saving and loading. For example, in some configurations, automated machine control languages may be used for data acquisition and visualization. This may allow data capturing to be liberated from the storage limitations of the testing device to the size of the storage device coupled to the computing device (computer hard disk, for example). In some configurations, machine control languages may support General Purpose Interface Bus (GPIB) and Virtual Instrument Software Architecture (VISA) standard protocols (e.g., GPIB, Versa Module European (VME) eXtenstions for Instrumentation (VXI), GPIB-VXI, USB, Transmission Control Protocol (TCP)/Internet Protocol (IP) (e.g., TCP/IP), serial, etc.). In some cases, one or more automated program executables may run directly on the scope machine to eliminate the data capture throughput bottle neck that may be associated with the GPIB-USB controller cable between the computing machine and scope. In some configurations, the external hard disk may be connected directly to the scope machine using a Serial Advanced Technology Attachment (SATA) or High Speed USB interface.

For example, data capture instructions (e.g., MATLAB source code) may be used to iteratively trigger and save desirable data in real time. Additionally or alternatively, data visualization instructions may be used for offline processing of saved data (the data captured with the data capture instructions, for example).

In one configuration, the DUT may be a modem that is coupled to a computing device via over a USB communications interface. In one example, each capture may have a sampling rate of 400 nanoseconds/point (ns/pt) to 800 ns/pt for a 400 millisecond (ms) time duration. In one configuration, data may be captured (via MATLAB source code, for example) in real time and data may be visualized (via MATLAB code, for example) and analyzed offline (after an error has occurred, for example). In one configuration (when debugging a USB interface, for example), the trigger for the D+ channel may be set for the falling edge at 2 volts (V). In another example, physical layer analysis may allow for visualization of physical layer errors.

In some configurations, a controlled oscilloscope may capture the physical layer analog signals from the physical layer (e.g., bus) together with other system signals at the proper resolution settings. The computing device may capture the real-time bit level signal to a storage device. In some cases, the storage device may be external to the oscilloscope (the storage device may be coupled to the computing device, for example). This may allow for days and weeks of the real-time bit-level signal data to be stored. In some cases, external storage may be attached to the scope machine for direct storage (without an intervening computing device, for example). In these cases, the testing device may have fast enough computing capability for direct storage processing.

In some configurations, the data capture program may be automated. The following instructions (e.g., steps, commands, etc.) may be one possible configuration of an iterative data capture program. The data capture program may identify one or more enabled channels and may obtain identifying legends for the one or more enabled channels. For example, a user may select (in a Graphical User Interface (GUI), for example) one or more channels as enabled channels. In this example, the user may also provide an identifying legend (e.g., name) for each enabled channel. In another example, the one or more enabled channels may be automatically selected and may be automatically provided with a legend. The data capture program may identify (e.g., read, determine, etc.) the one or more enabled channels. The data capture program may also save the channel legend for each of the enabled channels to strings. The data capture program may also identify a directory for saving data. The data capture program may determine the parameters (for each enabled channel, for example) for the data capture. In one example, one or more parameters may be set by a user. In another example, one or more parameters may be automatically determined. In one configuration, the developed automated scope data acquisition system may allow physical layer signaling data to be saved on a generous external hard disk and to be analyzed offline. The physical layer signaling data may additionally or alternatively be analyzed after an issue is caught.

The data capture program may begin a capture loop to capture the specified data (e.g., capturing the enabled channels with the identified parameters and saving the captured data to the identified directory). Each capture loop may be initiated by a configured trigger on the scope. The waveform data after each trigger may be saved to a file (e.g., .mat file) with a filename that is named with the time stamp of the captured data. The testing device may be set to be in a run state for the next trigger. The capture loop may end with a determination of whether an ending condition has been satisfied. If an ending condition has not been satisfied, then the capture loop begins again. If an ending condition has been satisfied, then the data capture program may end.

Captured data may be analyzed and visualized offline. In some configurations, captured data may be displayed in a GUI. In one example, captured data may be read from a specified directory. One or more plots may be displayed. For example, a collection of files may be displayed together (e.g., a plot). In some cases, each waveform of the same file may be displayed separately (e.g., subplot). In some configurations, high resolution data may be captured to allow plotting of a smaller duration of time at a higher resolution using a zoom feature.

In some configurations, the computing device may include a program for analyzing the captured data. Additionally or alternatively, the computing device may have data visualization software. In some configurations, the data visualization software may utilize a GUI for signal analysis and visualization. The computing device may save continuous data to files with names using the capturing time. The computing device may also generate visualizations with signal diagram overlapping and separation features. The computing device may additionally provide data file stepping, fast-roll and stop features for data visualization. The computing device may further provide the ability to zoom (e.g., in or out) on high resolution signals for micro second glitches to tens of seconds of timing analysis. In some configurations, mathematical operations may be performed on the captured data to automate issue screening etc.

In some configurations, the systems and methods disclosed herein may be beneficial for identifying and solving many intermittent communications interface (e.g., USB 2.0) issues and power management issues on the DUT. For example, the systems and methods disclosed herein may be used for capturing and indicating physical layer errors. Physical layer error detection may allow for errors to be detected that may otherwise be undetectable (by a protocol analyzer, for example). For example, a proper signal with an incorrect power level may cause a physical layer error. As another example, the systems and methods disclosed herein may be used to solve host resume-reset race conditions causing USB disconnection (see http://support.microsoft.com/kb/2416007, for example), USB PHY calibration issue, USB power management driver issue and device LPM-reset racing condition etc.

In one configuration, the systems and methods disclosed herein may provide an automated verification and debugging platform. The systems and methods disclosed herein may also be used to reduce product development time. The systems and methods disclosed herein may further allow for better captured data organization and visualization. The systems and methods disclosed herein may further allow for offline analysis with powerful analysis software that may provide computational intensive signal analysis (which may not be possible on a testing device).

In one more specific example, the systems and methods disclosed herein may be applied to a computing device with a large size hard disk and loaded with an automated standalone executable for machine control (using MATLAB, for example), a Tektronix scope TDS7254 controlled machine for data capture, a Lecroy CATC analyzer and the platform with GOBI device under test (DUT). In some configurations, the computing device and storage hard disk may be an embedded system of the oscilloscope (e.g., Tektronix TDS7254). The USB D+, D−, VCC, clock (e.g., MSM CLK) signals may being captured on the Tektronix TDS7254 channels triggering at specific conditions. In some configurations, an automation program may automatically capture all of the physical layer signal data in real time and may transfer and saved the physical layer signal data to the hard disk coupled to the computing device. In some cases, the system may be able to save data for a long duration of time (e.g., weeks) provided that the computing device has sufficient memory space. In some configurations, a separate standalone graphical user interface (GUI) program may allow analysis and visualization of the saved data.

In some configurations, due to the large amount of data files saved that may be saved, a specific time range of files may be selected for analysis based on an error indication by a protocol analyzer (e.g., CATC USB protocol analyzer) or other system level logs. For example, the specific time of an error may be determined by a protocol analyzer.

In some cases, the selected captured signals may be visualized in an overlapping timing diagram for better timing analysis (e.g. PLOT). Additionally or alternatively, the selected captured signals may provide separate timing diagrams for cleaner visualization (e.g. SUBPLOT feature). In some configurations, a data file stepping feature, fast roll and/or stop features may also be provided. In some configurations, zooming features may allow microsecond hardware glitches to be analyzed and visualized.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a computing device 102 in which systems and methods for indicating a physical layer error may be implemented. The computing device 102 may communicate with a testing device 112. For example, the computing device 102 may send commands to the testing device 112 and may receive data (e.g., captured physical (PHY) layer data) from the testing device 112. In some configurations, the computing device 102 may be coupled to the testing device 112.

The testing device 112 may be coupled to a first electronic device 114. For example, the testing device 112 may be coupled to the first electronic device 114 with one or more test probes. In some configurations, the testing device 112 may be coupled to one or more physical layer connection points on the first electronic device 114. The testing device 112 may connect to physical layer connection points to capture physical (PHY) layer signals. For instance, the testing device 112 may be coupled to one or more board level signals on the first electronic device 114, to one or more connecting wires, etc.

The first electronic device 114 may be coupled to a second electronic device 116 via a communications interface 118. Examples of electronic devices 114, 116 include circuits, integrated circuits, computing devices, modems, storage devices, etc. Examples of communications interfaces 118 include Bluetooth, PCI Express, IEEE 1394, Fibre Channel, USB, Wireless USB, Ethernet, RS-232, etc. In one example, the communications interface 118 between a first integrated circuit and a second integrated circuit may be a RS-232 interface. In another example, the communications interface 118 between a modem (e.g., data modem) and a computing device may be a USB interface. In yet another example, the communications interface 118 between a first network appliance in one city and a second network appliance in another city may be a fibre channel interface. In some configurations, the first electronic device 114 and the second electronic device 116 may be communicating (performing bi-directional communication, for example) over the communications interface 118.

In some configurations, one or more of the physical layer connection points on the first electronic device 114 may correspond to the communication interface 118. For example, the testing device 112 may capture PHY layer signals that include interface signals (corresponding to the communications interface 118, for example) and system level signals (from the first electronic device 114, for example). In some configurations, the first electronic device 114 may be a device under test (DUT).

The computing device 102 may include a data capture module 104 and a storage device 110. The data capture module 104 may obtain and store PHY layer data from the testing device 112. The data capture module 104 may include a command module 106 and a storing module 108.

The command module 106 may generate one or more commands (e.g., instructions, machine control commands) for the testing device 112. In some configurations, a command may include one or more directives (a directive to capture at least one physical layer signal, for example) for the testing device 112. In some cases, the one or more directives may be in a machine control language (a machine control language from MATLAB Instrument Control Toolbox, for example). For example, the directive may include specific instructions (in the machine control language of the testing device 112, for example) for controlling the testing device 112. In some configurations, machine control languages may support General Purpose Interface Bus (GPIB) and Virtual Instrument Software Architecture (VISA) standard protocols (e.g., GPIB, GPIB-VXI, VXI, USB, TCP/IP, serial, etc.). In some configurations, the command module 106 may generate a command with a directive for the testing device 112 to capture one or more PHY layer signals (e.g., PHY layer data). For example, the command may specify the capturing parameters for each PHY layer signal. Additionally or alternatively, in some configurations, the command module 106 may generate a command for the testing device 112 to send the captured PHY layer data to the computing device 102 over a standard protocol.

The storing module 108 may obtain the PHY layer data from the testing device 112 and may store the PHY layer data in a storage device 110. In one configuration, the storing module 108 may obtain the PHY layer data through one of the standard protocols (GPIB, for example). In some configurations, the storing module 108 may store the PHY layer data based on a time stamp of the data (corresponding to the time that the PHY layer data was captured, for example). A time stamp may be derived from a variety of sources. For example, the time stamp may be derived from the clock signal on the first electronic device 114, from the timing information available at the testing device 112 (oscilloscope, for example) and/or may be derived from a clock available on the computing device 102 itself. In some configurations, the storing module 108 may obtain and store the PHY layer data in real time.

The storage device 110 may store the PHY layer data. Examples of storage devices 110 include hard disks, flash memory, dynamic random access memory (DRAM), static random access memory (SRAM), floppy disks, magnetic tapes, optical disks and any other data storage medium. Examples of configurations of storage devices 110 include direct-attached storage (DAS), storage area network (SAN) and networkattached storage (NAS), etc. In one configuration (as illustrated in FIG. 1), the storage device 110 may be within the computing device 102. Additionally or alternatively, in another configuration (not shown), the storage device 110 may be external to the computing device 102. In either case, the storage device 110 may be included within and/or coupled to the computing device 102 and may store the PHY layer data.

Figure 2:
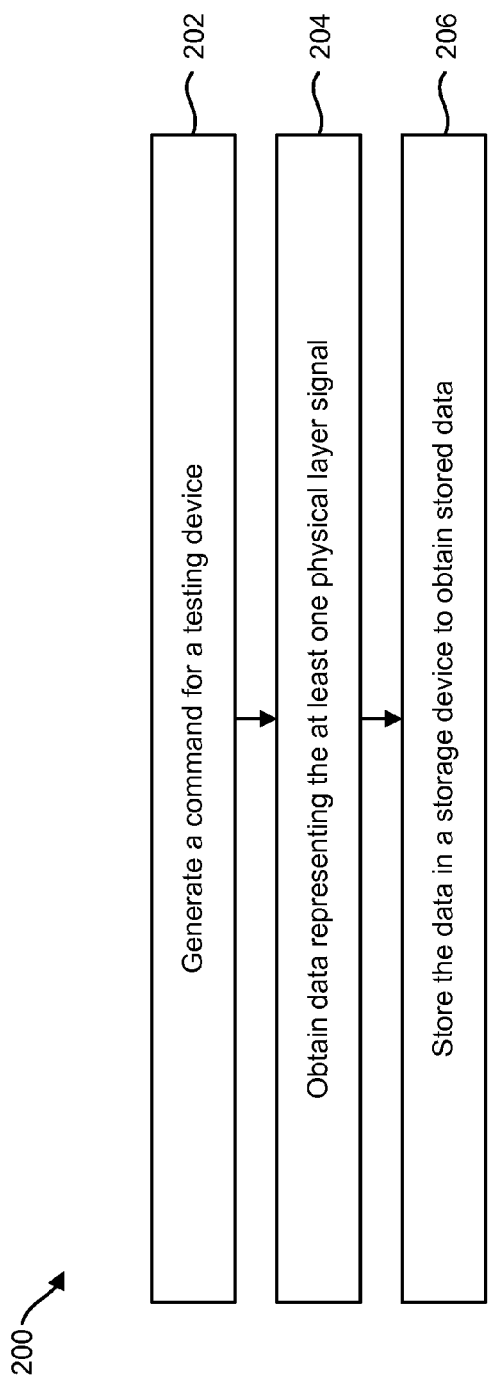
FIG. 2 is a flow diagram illustrating one configuration of a method for indicating a physical layer error on a computing device.

FIG. 2 is a flow diagram illustrating one configuration of a method 200 for indicating a physical layer error on a computing device 102. The computing device 102 may generate 202 a command for a testing device 112. In some configurations, the command may include one or more instructions for capturing at least one PHY layer signal. In one example, capturing at least one PHY layer signal comprises capturing one or more PHY layer signals that correspond to a communications interface 118 between a first electronic device 114 and a second electronic device 116. In some configurations, the computing device 102 may communicate with the testing device 112 over a mutually supported protocol (e.g., GPIB, VISA, etc.). In one example, one or more of the commands generated 202 by the computing device 102 may be based on a suitable machine control language.

The computing device 102 may obtain 204 data representing the at least one PHY layer signal. For example, the computing device 102 may receive data representing the at least one physical layer signal from the testing device 112. In some configurations, the testing device 112 may capture one or more of the PHY layer signals in an analog mode (at sufficient resolution to capture how the physical layer signal changes over time, for example) (400 ns/pt to 800 ns/pt sampling rate for a 400 ms time duration, for example).

The computing device 102 may store 206 the data in a storage device 110 to obtain stored data. For example, the computing device 102 may store 206 (e.g., write) the data on the storage device 110 as one or more files. For example, the one or more files may be created based on the time duration of the capture, file size, testing device 112 capture cycle, etc. In some configurations, the files may be named based on the time stamp of the data that was captured in the file. In some cases, the one or more files may be organized based on the capture time of each file (the capture time of the data in each file, for example). For example, the files may be organized by time stamp and/or filename (when the filename is based on the capture time, for example). In some configurations, the files may be stored 206 (e.g., written) to a specified directory on the storage device 110. The stored signal may be obtained when the data is stored 206 in the storage device 110.

The stored data may be a digital representation of one or more analog signals (e.g., physical (PHY) layer signals). For example, the stored data may be obtained by sampling one or more analog signals at a high sample rate. For instance (in the case of a USB interface, for example), depending on the memory depth of the scope, each PHY layer signal may be captured at an adjusted sampling rate and time duration. In one configuration, the 400 ns/pt sampling rate may be used for a 400 ms duration of time. In many cases, a physical layer error may only be indicated at the analog level. Because of the high sampling rate, the stored signal may indicate any physical layer errors (if there is any physical layer error, for example).

Figure 3:
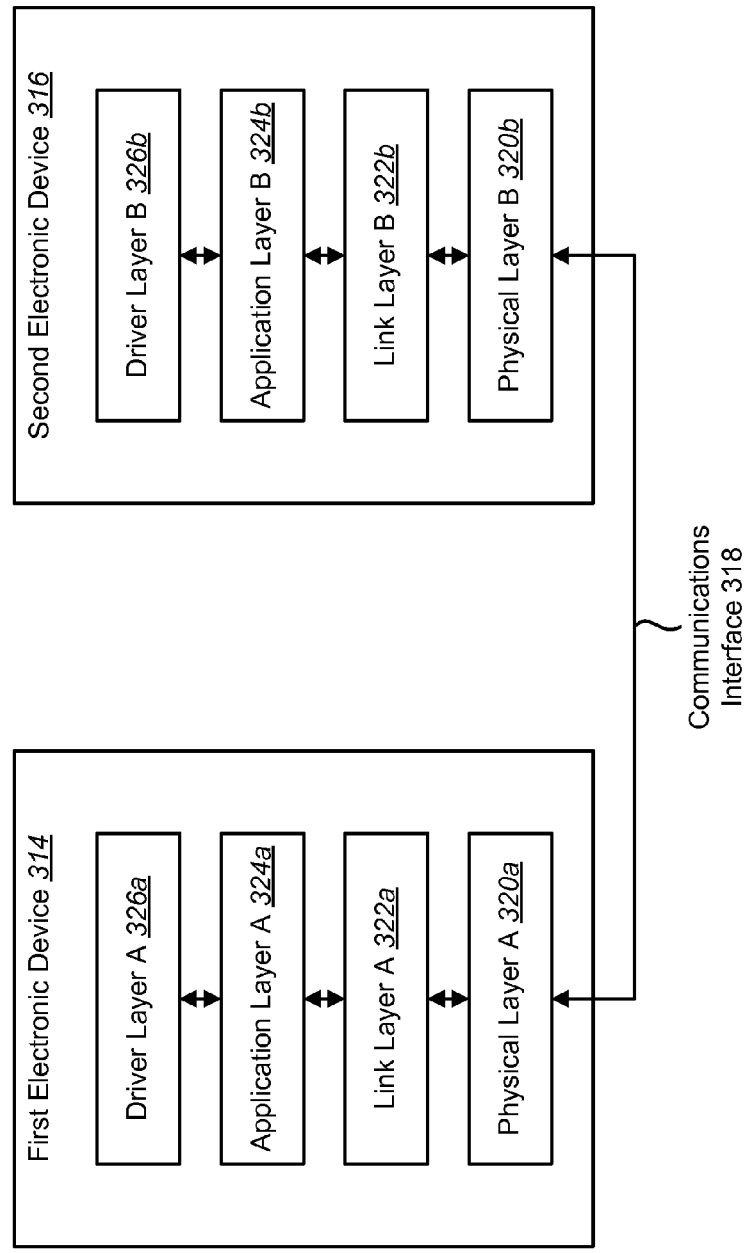
FIG. 3 is a block diagram illustrating one configuration of a first electronic device and a second electronic device with their corresponding layers.

FIG. 3 is a block diagram illustrating one configuration of a first electronic device 314 and a second electronic device 316 with their corresponding layers 320, 322, 324, 326. The first electronic device 314 may be similar to the first electronic device 114 discussed previously with respect to FIG. 1. The second electronic device 316 may be similar to the second electronic device 116 discussed previously with respect to FIG. 1. As illustrated the first electronic device 314 and the second electronic device 316 may be coupled together by a communications interface 318. The communications interface 318 may be similar to the communications interface 118 discussed previously with respect to FIG. 1.

In some configurations, a communication between a first electronic device (e.g., first electronic device 314) and a second electronic device (e.g., second electronic device 316) may be described as having various layers (e.g., physical layer 320*a-b*, link layer 322*a-b*, application layer 324*a-b* and driver layer 326*a-b*). Each layer may correspond to a particular aspect of the communication. For example, the physical layer 320*a-b* (e.g., the lowest layer) may correspond to bit level (e.g., raw) signal (e.g., physical (PHY) layer signal) that is sent over the physical transportation medium (e.g., bus, fiber optic filament, etc.). For instance, the physical (PHY) layer 320*a-b* may correspond to the voltage changes being transmitted on a copper bus (bit level communication, for example). The higher level layers (e.g., link layer 322*a-b*, application layer 324a-b and driver layer 326a-b) may correspond to higher level functions of the communication. For example, the link layers 322a-b may correspond to the protocols (e.g., transport layer protocols) that are used for communicating over the physical layer 320a-b (packet level communication, for example). The application layers 324a-b may correspond to the protocols that enable software to software communication over the link layer 322a-b (e.g., process to process communication, for example). The driver layers 326a-b may correspond to the protocols that enable driver level communication (e.g., driver to driver communication, for example). In some cases (not shown), an electronic device may include additional and/or alternative layers (e.g., the seven layers of the Open Systems Interconnection model (OSI model)).

The first electronic device 314 may include various layers. For example (as illustrated in FIG. 3), the first electronic device 314 may include physical (PHY) layer A 320a, link layer A 322a, application layer A 324a and driver layer A 326a. The second electronic device 316 may also include various layers. For example (as illustrated in FIG. 3), the second electronic device 316 may include physical (PHY) layer B 320b, link layer B 322b, application layer B 324b and driver layer B 326b. It is noted that the communications interface 318 couples physical layer A 320a on the first electronic device 314 with physical layer B 320b on the second electronic device 316. This is because the higher level communication layers are abstractions that are based on the low level physical layer signal at the physical layer 320a-b. It is noted that physical layer signals on the communications interface 318 may be captured at the physical layer of the electronic device (e.g., physical layer A 320a). Thus, the first electronic device 314, the second electronic device 316 and the communications interface 318 may be debugged based on the physical layer signals at physical layer A 320a. Additionally or alternatively, the first electronic device 314, the second electronic device 316 and the communications interface 318 may be debugged based on the physical layer signals at physical layer B 320b.

It is noted that errors may occur at any of the communication layers. For example, an error may be confined to the physical layer 320a-b. An error that occurs at the physical layer 320a-b may be referred to as a physical layer error. In some cases, physical layer errors may not be analyzed (e.g., analyzable) at higher layers.

For example, a physical layer error could be any signaling errors due to an unexpected voltage level, a glitch, a timing violation or a short. A physical layer error may or may not cause a system issue and is not able to be analyzed with a high level debugger. In some cases, a physical layer error may cause errors at higher layers. However, the cause of the error may be difficult to determine. For instance, a protocol analyzer or analysis of data at a higher layer may not be able to determine the root cause of the resulting error. A protocol analyzer may be designed to focus on higher protocol level errors due to machine complexity, memory requirements, etc. Thus, a protocol analyzer may not provide a good way to analyze low level signaling errors. For example, High Speed USB (HSUSB) handshaking (chirpings) and resume/suspend/reset signaling errors are normally not analyzable with a protocol analyzer (e.g., Lecroy CATC protocol analyzer). The systems and methods described herein may allow for the analysis of physical layer errors. For example, the systems and methods disclosed herein may enable identification of glitches, power voltage violations, system clock and other system signals that are not part of the standard protocols that have an off-the-shelf protocol analyzer.

As another example, a physical layer error may occur if there is an errant voltage level (as a result of a hardware glitch, for example) at the physical layer. For instance, the second electronic device 316 may send an unexpected reset to the first electronic device 314 that results in an errant voltage level. In some cases, this errant voltage may cause a physical layer error.

There are many other conditions that may cause a physical layer error. For example, any errors that may be caused by a PHY device or a PHY-link device malfunction. For example, a physical layer error may occur if there is a calibration problem at the physical layer. Examples of physical layer errors include state-machine intermittent errors, power management issues, PHY calibration issues, PHY layer transceiver issues, timing issues, signal integrity issues, racing conditions, board level signal integrity issues, power stability issues and board system level signaling issues, etc.

In many cases (as indicated above), a physical layer error may be indicated (e.g., identified, analyzable) by an analog signal capture (capturing how the signal(s) change over time, for example) of the physical layer. The stored data may be a digital representation of the analog signals at a sufficient resolution to indicate the physical layer error(s). In some configurations, the physical layer data may represent how one or more voltage levels vary over time.

Physical layer data may include physical layer data from a first electronic device (e.g., first electronic device 314). For example, the physical layer data (at physical layer A 320a, for example) may include a clock signal (e.g., Mobile Station Modem (MSM) clock signal) from the first electronic device 314. As another example, the physical layer data may include power information (e.g., power supply voltages, power supply current levels, etc.) from the first electronic device 314. Additionally or alternatively, physical layer data may include physical layer data from the communications interface (e.g., communications interface 318). For example (in the case of a USB interface, for instance), the physical layer data may include the VCC, D+, D− and/or ground (GND) signals. In some configurations, physical layer data corresponding to the communications interface 318 may be taken from one or more connection points on the first electronic device 314 (where the communications interface 318 connects to the first electronic device 314, for example).

It is noted that software level loggers and protocol analyzers may not analyze the physical layer 320a-b. Instead, software level loggers and protocol analyzers may analyze higher level layers (e.g., driver layer 326a-b, application layer 324a-b, link layer 322a-b). However, because software level loggers and protocol analyzers do not analyze the physical layer 320a-b, they may not capture and/or indicate physical layer errors.

Figure 4:
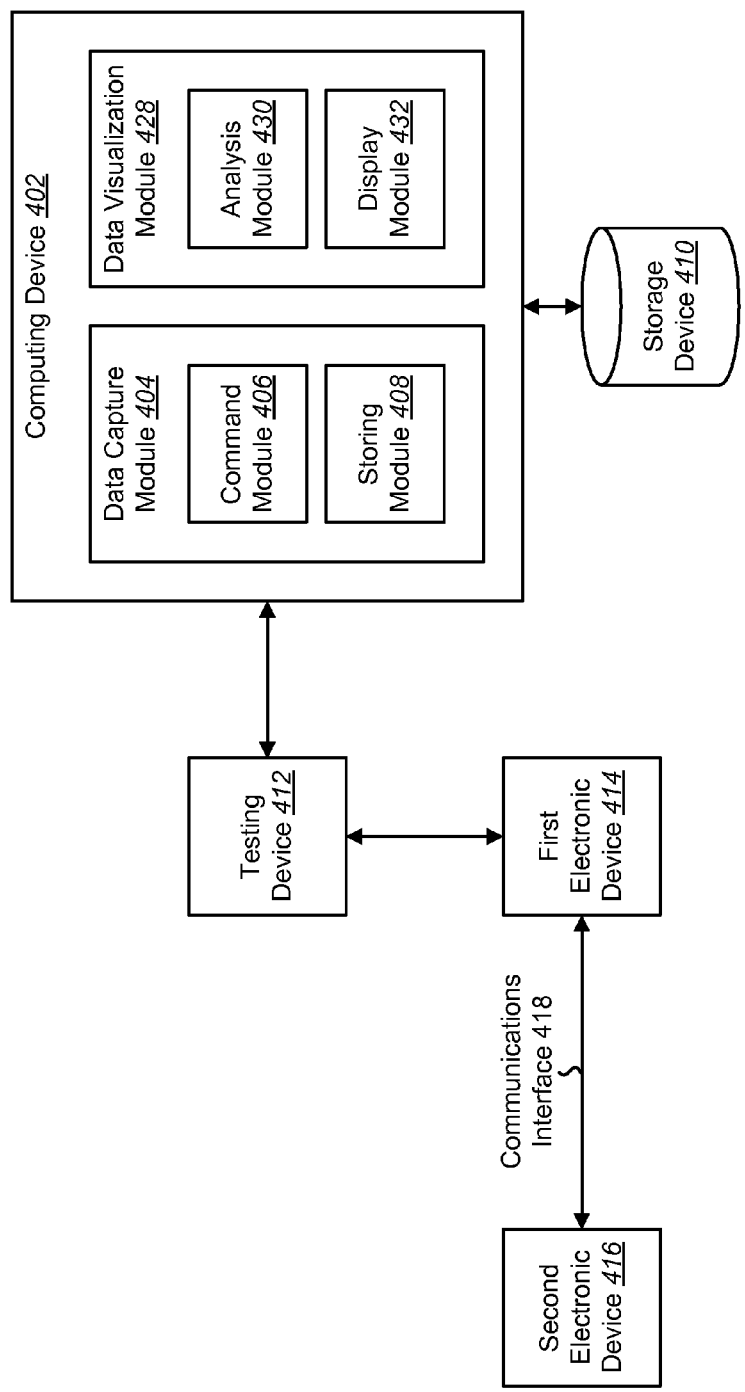
FIG. 4 is a block diagram illustrating another configuration of a computing device in which systems and methods for indicating a physical layer error may be implemented.

FIG. 4 is a block diagram illustrating another configuration of a computing device 402 in which systems and methods for indicating a physical layer error may be implemented. The computing device 402 may communicate with a testing device 412. The computing device 402 may be similar to the computing device 102 discussed previously with respect to FIG. 1. The testing device 412 may be similar to the testing device 112 discussed previously with respect to FIG. 1.

The testing device 412 may be coupled to a first electronic device 414. The first electronic device 414 may be similar to one or more of the first electronic devices 114, 314 discussed previously with respect to FIGS. 1 and 3. In some configurations, the testing device 412 may be coupled to one or more physical layer connection points (coupled to physical (PHY) layer A 320a, for example) on the first electronic device 414. The first electronic device 414 may be coupled to a second electronic device 416 with a communications interface 418. The second electronic device 416 may be similar to one or more of the second electronic device 116, 316 discussed previously with respect to FIGS. 1 and 3. The communications interface 418 may be similar to one or more of the communications interfaces 118, 318 discussed previously with respect to FIGS. 1 and 3.

The computing device 402 may include a data capture module 404 and a data visualization module 428. The data capture module 404 may include a command module 406 and a storing module 408. The data capture module 404 may be similar to the data capture module 104 described previously with respect to FIG. 1. The command module 406 may be similar to the command module 106 described previously with respect to FIG. 1. The storing module 408 may be similar to the storing module 108 described previously with respect to FIG. 1.

The computing device 402 may be coupled to a storage device 410. The storage device 410 may be similar to the storage device 110 discussed previously with respect to FIG. 1. In some configurations (as illustrated in FIG. 1, for example), the storage device (e.g., storage device 110) may be within the computing device (e.g., computing device 102). In other configurations (as illustrated in FIG. 4, for example), the storage device (e.g., storage device 410) may be external to the computing device (e.g., computing device 402). In either case, the storage device may provide ample storage for stored data (that may indicate a physical layer error, for example). As discussed previously, the stored data may be a representation of one or more physical layer signals.

The data visualization module 428 may allow the stored data to be analyzed and displayed to a user. The data visualization module 428 may include an analysis module 430 and a display module 432.

The analysis module 430 may analyze the stored data. For example, in one configuration, the analysis module 430 may compare the stored data to one or more thresholds (to determine if the one or more physical layer signals are within normal operating ranges, for example). In some configurations, the analysis module 430 may perform mathematical operations on the stored data. For example, the analysis module 430 may perform operations on the stored data to generate analyzed data.

In some configurations, the analysis module 430 may automatically detect and/or indicate any physical layer errors. For example, the analysis module 430 may determine whether the signal represented by the stored data satisfies one or more criteria. For instance, the analysis module 430 may determine whether the signal amplitude, phase, frequency, response time, etc., is/are outside of one or more particular specified ranges. In one example, the analysis module 430 may detect if a signal voltage is too high or too low. In other examples, the analysis module 430 may detect if signal phase, frequency, phase drift, frequency drift, response time (e.g., rate of change), ripple, signal-to-noise (SNR), etc., is/are outside of particular ranges (that indicate desirable or expected characteristics, for example). If the data indicates that the signal characteristics(s) are outside of one or more specified ranges, the analysis module 430 may detect and/or indicate one or more physical layer errors. In some configurations, the analysis module 430 may compare the signal indicated by the stored data with a model (with expected or desirable characteristics, for example). The analysis module 430 may indicate one or more differences between the signal and the model and/or may designate one or more differences as physical layer errors.

The display module 432 may display the stored data for visualization. In some configurations, the display module 432 may additionally or alternatively display analyzed data for visualization. For instance, the display module 432 may display instances in the signal where a physical layer error has been detected. Additionally or alternatively, the display module 432 may display differences between the signal represented by the stored data and a model. In some configurations, the display module 432 may generate plots and/or subplots based on the stored data. In some cases, the display module 432 may generate plots and/or subplots based on one or more files of the stored data.

Figure 5:
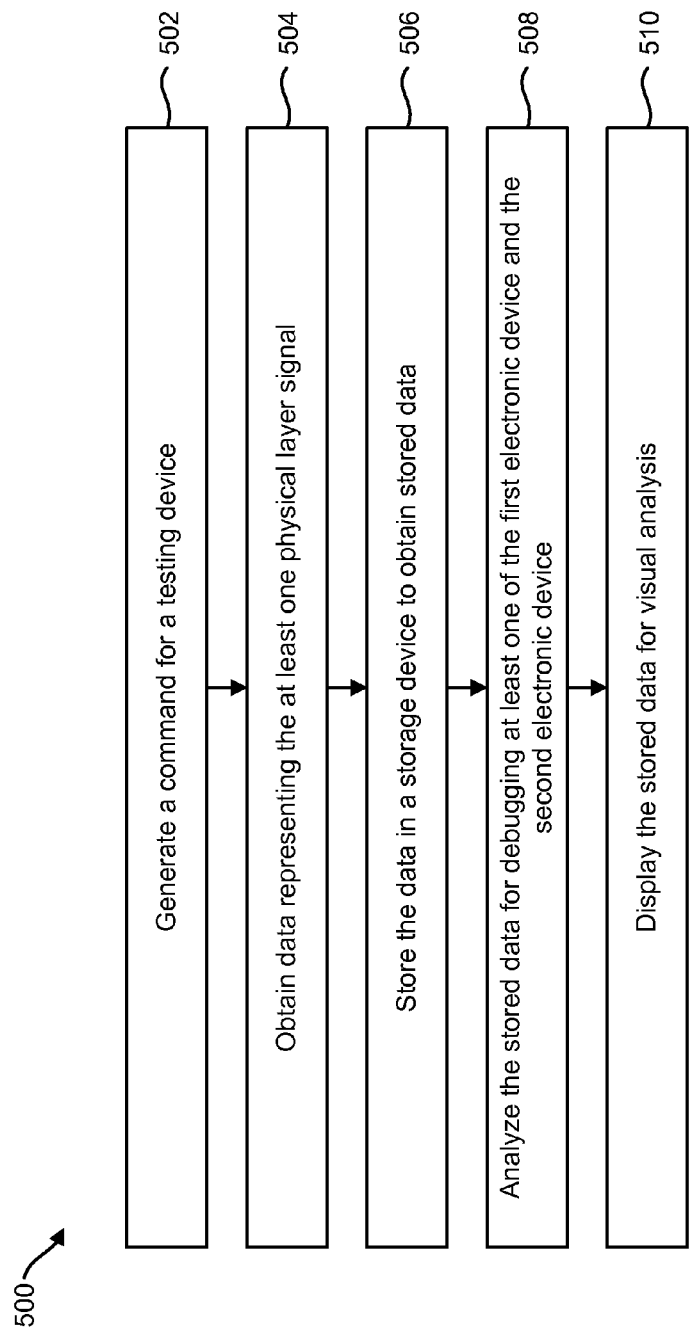
FIG. 5 is a flow diagram illustrating another configuration of a method for indicating a physical layer error on a computing device.

FIG. 5 is a flow diagram illustrating another configuration of a method 500 for indicating a physical layer error on a computing device 402. The computing device 402 may generate 502 a command for a testing device 412. Generating 502 a command for a testing device 412 may be similar to generating 202 a command for a testing device 212 as discussed previously with respect to FIG. 2. The computing device 402 may obtain 504 data representing the at least one physical (PHY) layer signal. Obtaining 504 the data representing the at least one physical layer signal may be similar to obtaining 204 the data representing the at least one physical layer signal as discussed previously with respect to FIG. 2. The computing device 402 may store 506 the data in a storage device 410 to obtain stored data. Storing 506 the data in a storage device 410 may be similar to storing 206 the data in a storage device 110 as discussed previously with respect to FIG. 2.

The computing device 402 may analyze 508 the stored data for debugging at least one of the first electronic device 414 and the second electronic device 416. For example, the computing device 402 may determine based on the stored data whether a physical layer error was caused by the first electronic device 414 and/or the second electronic device 416. For instance, if a physical layer signal sent by the second electronic device 416 includes an errant power level, then the computing device 402 may determine that the second electronic device 416 was the cause of the physical layer error. Additionally or alternatively, the computing device 402 may analyze the stored data to determine whether the physical layer error is the result of a chip malfunction, hardware error or signal integrity. For instance, the computing device 402 may determine that a particular chip (on the second electronic device, for example) may be having a calibration error (e.g., a particular physical layer error). In some configurations, the computing device 402 may perform one or more mathematical operations on the stored data as part of the analysis 508. In some cases, this analyzed data may additionally or alternatively used for debugging the source of the error (e.g., the first electronic device 414 or the second electronic device 416). In some configurations, this may be done as described above for the analysis module 430 in connection with FIG. 4.

The computing device 402 may display 510 the stored data for visual analysis. For example the computing device 402 may display 510 the stored data as one or more plots and/or subplots. For instance, the computing device 402 may display 510 the captured physical layer signal as a plot (with respect to time, for example). In some configurations, the computing device 402 may generate a single plot (or subplot, for example) based multiple files of the stored data. For example, the computing device 402 may associate stored data from two or more files (with sequential time stamps, for example) to obtain a single plot. In some configurations, the plot may be displayed 510 for visual analysis. For example, one or more plots and/or subplots may be displayed (e.g., illustrated, depicted) on a visual display device (e.g., screen, monitor, printer, etc.)

Figure 6:
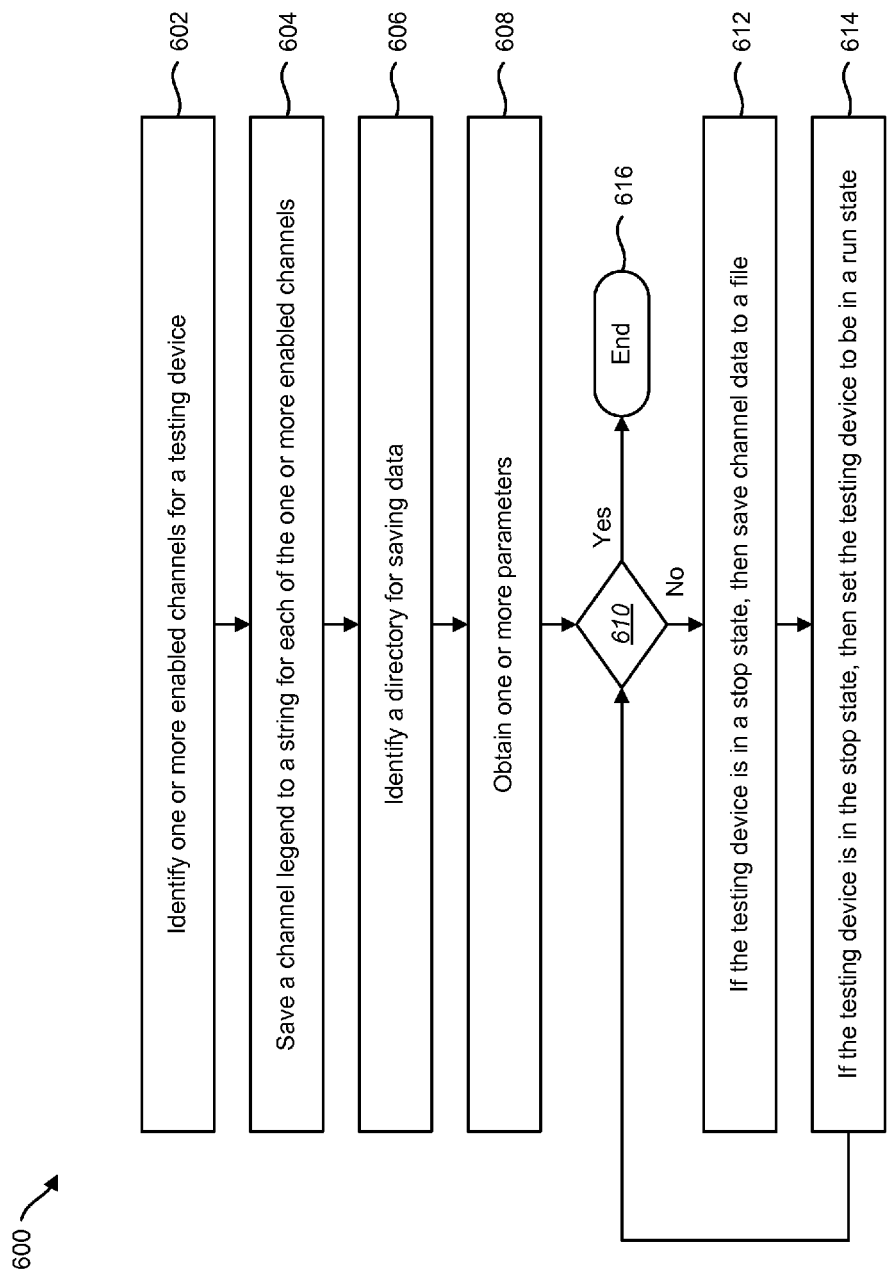
FIG. 6 is a flow diagram illustrating one example of a method for capturing a physical layer error on a computing device.

FIG. 6 is a flow diagram illustrating one example of a method 600 for capturing a physical layer error on a computing device 102. The computing device 102 may identify 602 one or more enabled channels for a testing device 112. For example, the testing device 112 may have one or more test probes for capturing a physical layer signal. In one configuration, each test probe may correspond to a single channel. In this configuration, the computing device 102 may automatically identify 602 which test probes are coupled to the first electronic device 114 (e.g., enabled). In another configuration, enabled channels for the testing device 112 may be manually identified. For example, a user may select (e.g., identify 602) one or more enabled channels for the testing device 112.

The computing device 102 may save 604 a channel legend to a string for each of the one or more enabled channels. In one configuration, the channel legends may be automatically generated (channel 1, channel 2 . . . , for example) by the computing device 102. Additionally or alternatively, one or more channel legends may be manually assigned (through a graphical user interface (GUI), for example). The channel legends may be saved 604 to a string for each one of the enabled channels. For example, each channel legend may be saved with the stored data associated with each enabled channel (so that each enabled channel may be identified by the corresponding channel legend, for example).

The computing device 102 may identify 606 a directory for saving data. For example, the computing device 102 may identify 606 a directory in the storage device 110 where the physical layer signal data should be saved. In one example, the computing device 102 may identify 606 a directory based on user input (through a GUI, for example). In another example, the computing device 102 may automatically generate and identify 606 a directory for saving data. In some configurations, the directory may specify where each of the files associated with the captured physical layer signals may be stored.

The computing device 102 may obtain 608 one or more parameters. In one configuration, the computing device 102 may obtain 608 one or more parameters based on a user selection (through a GUI, for example). For instance, the one or more parameters may be based on a previous (e.g., stored) user selection. Additionally or alternatively, the one or more parameters may be based on a current user selection. In another configuration, the one or more parameters may be obtained 608 based on an automated algorithm and/or predefined settings for a particular communications interface 118 type (e.g., USB). In some configurations, the one or more parameters may include a capture scale and a trigger level for the capture. In some configurations, the one or more parameters include at least one scale parameter or at least one trigger level parameter. A scale parameter may indicate the scale (e.g., the resolution) of the capture. A trigger level parameter may indicate a threshold that an input wave must reach before a sweep is performed. For example (in the case of a USB interface, for example), an appropriate trigger level may be a 2 volt trigger level.

The computing device 102 may determine 610 whether an end condition has occurred. For example, an end condition may occur when there is no longer a physical layer signal to capture. As another example, an end condition may occur based on a timer. It is noted that an end condition may occur based on a variety of conditions.

If it is determined 610 that an end condition has not occurred, then a capture loop is begun (by taking the "No" branch as illustrated in FIG. 6). The capture loop may include obtaining captured physical layer signal information. The computing device 102 may save 612 channel data to a file if the testing device 112 is in a stop state. For example, the computing device 102 may save 612 the channel data in one or more files as discussed previously. In one configuration, the computing device 102 may save 612 the channel data in a file with a filename that is the time stamp of the channel data in the file. For instance, if the channel data (e.g., a physical layer signal) was captured with a particular timestamp, then the channel data would be saved 612 in a file with the time stamp as the filename (e.g., "Nov_05_08_02_35_758.mat" where the time stamp indicates November 5 at 8 hours, 2 minutes, 35 seconds and 758 thousands of a second).

Additionally, the computing device 102 may set 614 the testing device 112 to be in a run state if the testing device 112 is in the stop state. For example, setting the testing device 112 to be in a run state may set the testing device 112 into a capture state for capturing one or more physical layer signals. The capture loop may continue to the determination 610 of whether an end condition has occurred. If it is determined 610 that an end condition has not occurred, then the capture loop begins again. If it is determined that an end condition has occurred, then operation ends 616.

Figure 7:
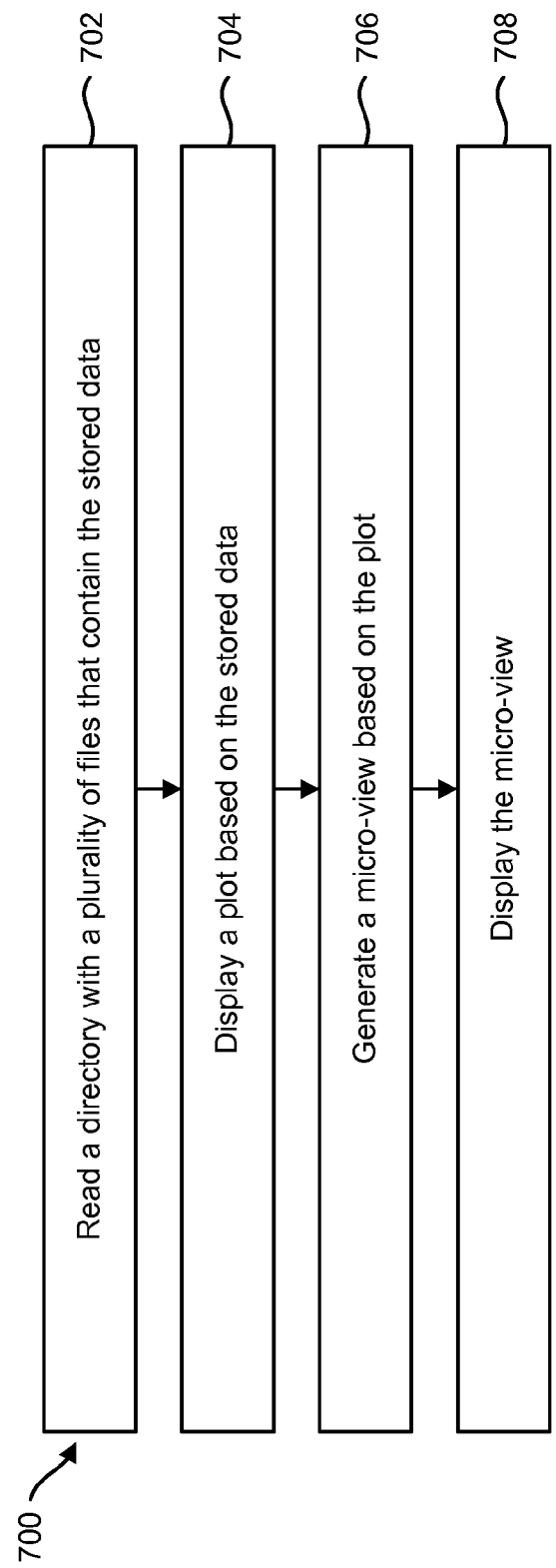
FIG. 7 is a flow diagram illustrating one example of a method for visualizing a physical layer error on a computing device.

FIG. 7 is a flow diagram illustrating one example of a method 700 for visualizing a physical layer error on a computing device 402. The computing device 402 may read 702 a directory with a plurality of files that contain the stored data. For example, the computing device 402 may access the storage device 410 that contains the directory (e.g., the identified 606 directory as discussed previously with respect to FIG. 6). The plurality of files may be similar to the plurality of files discussed previously with respect to FIG. 2 (e.g., storing 206 the data in the storage device). In one configuration, each file may correspond to captured data with a different time stamp.

The computing device 402 may display 704 a plot based on the stored data. For example, the computing device 402 may display 704 the plot for visualizing a physical layer signal. In some cases, displaying 704 the plot of the physical layer signal may allow for analysis of the physical layer signal. In some configurations, the plot may be a subplot. For example, the computing device 402 may visually display 704 the subplot using a display device (e.g., monitor, projector, printer, plotter, etc.). As discussed above, the subplot may be a viewing option to display channel waveforms in separated windows.

The computing device 402 may generate 706 a micro-view based on the plot. In one example, a micro-view may be generated by zooming in on a particular time selection of the plot. For instance, the computing device 402 may zoom in on a physical layer error that is indicated in the plot. The zoomed in version of the physical layer error may indicate the cause of the physical layer error (for debugging the first electronic device 414 and/or the second electronic device 416, for example). In some configurations, the plot may be manipulated (e.g., by a user, by the computing device 402, etc.). For example, a selection of the plot may be zoomed into to generate 706 a higher resolution version of the selection (e.g., a micro-view). For instance, the selection may indicate a physical layer error. The computing device 402 may display 708 the micro-view. For example, the computing device 402 may display 708 the micro-view for visualizing a physical layer signal. In some cases, displaying 708 the micro-view of the physical layer signal may allow for enhanced analysis of the physical layer signal. For example, enhanced resolution for enhanced identification of physical layer errors (as described above). For instance, the enhanced resolution may be beneficial for allowing the root cause of a physical layer error to be determined and/or analyzed. In some cases, a physical layer error may not be analyzed without the enhanced resolution.

In some configurations, the plotting selections (the displayed 704, 708 plotting selections, for example) may be traversed (e.g., to go forward in time or to go backward in time). For example, the time frame of the selection may be shifted (to shift the plot, subplot and/or micro-view to display the stored data previous to the physical layer error, for example). The size of the step (e.g., shift) may vary (from nanoseconds to seconds, for example).

In some configurations, the traversed plot may be based on two or more files. For instance, a step to a previous time (e.g., a millisecond step, for example) may result in the plot being based only on the first file. For instance, a step to a subsequent time (e.g., a millisecond step, for example) may result in a plot being based only on the second file. In some configurations, the plot may be zoomed out to illustrate a lower resolution (although the lower resolution is still a higher resolution compared with the resolution of the plot, for example). It is noted, that in some configurations, the computing device 402 may automatically zoom in on and/or step through physical layer errors. In another example (to expedite and automate waveform analysis, for example), a roll feature may be used to automatically step through files for visualization in the selected directory and a stop feature may be used to stop the rolling feature.

Figure 8:
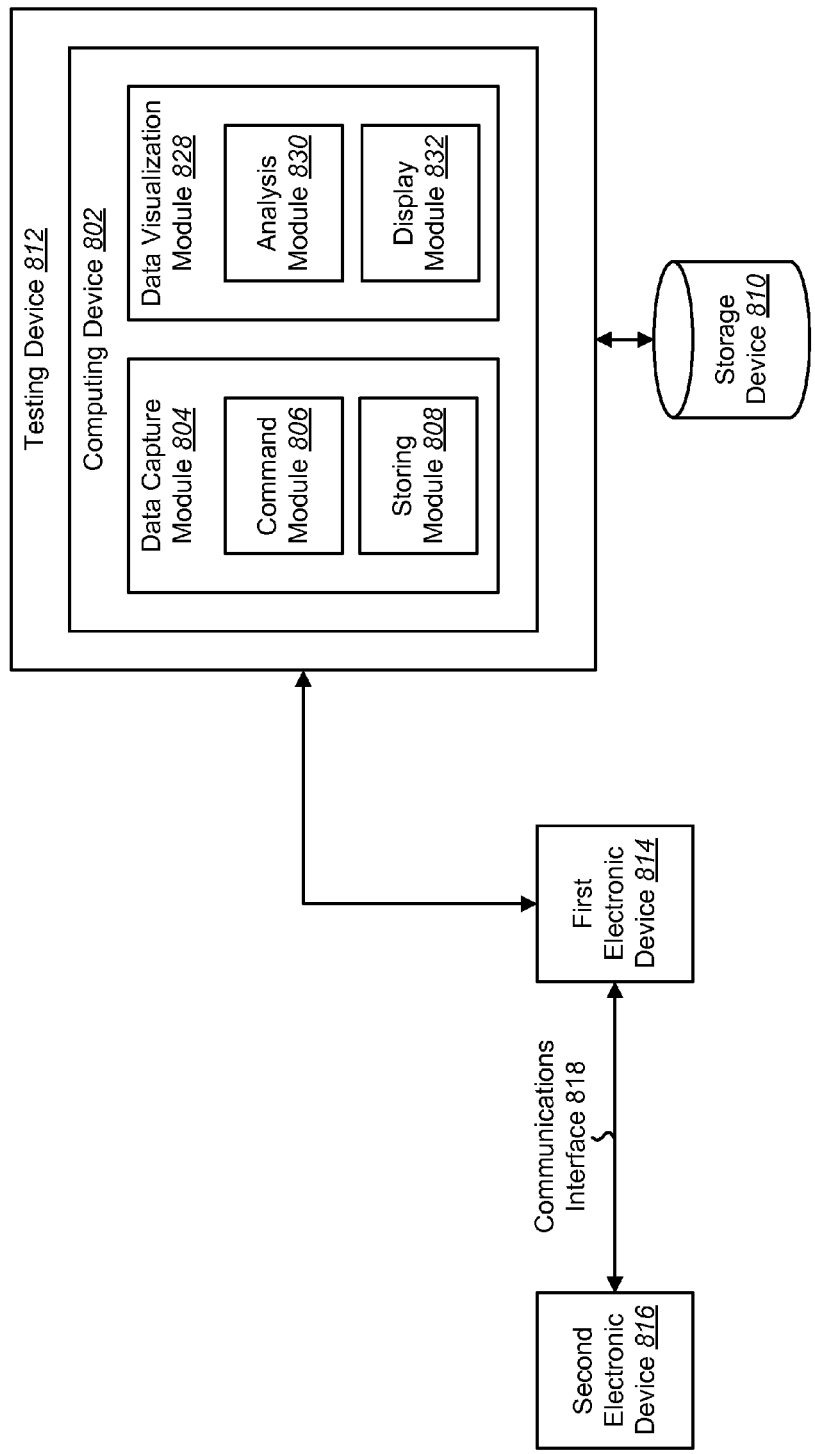
FIG. 8 is a block diagram illustrating another configuration of a computing device in which systems and methods for indicating a physical layer error may be implemented.

FIG. 8 is a block diagram illustrating another configuration of a computing device 802 in which systems and methods for indicating a physical layer error may be implemented. In one configuration (as illustrated in FIG. 8, for example), the computing device 802 may be included within the testing device 812. For example, the computing device 802 may be an embedded system within the testing device 812. The testing device 812 may be similar to one or more of the testing devices 112, 412 discussed previously with respect to FIGS. 1 and 4.

The testing device 812 may be coupled to a first electronic device 814. The first electronic device 814 may be similar to one or more of the first electronic devices 114, 314, 414 discussed previously with respect to FIGS. 1, 3 and 4. The first electronic device 814 may be coupled to a second electronic device 816 with a communications interface 818. The second electronic device 816 may be similar to one or more of the second electronic devices 116, 316, 416 discussed previously with respect to FIGS. 1, 3 and 4. The communications interface 818 may be similar to one or more of the communications interfaces 118, 318, 418 discussed previously with respect to FIGS. 1, 3 and 4.

The computing device 802 may be similar to one or more of the computing devices 102, 402 discussed previously with respect to FIGS. 1 and 4. For example, the computing device 802 may include a data capture module 804 similar to one or more of the data capture modules 104, 404 and a data visualization module 828 similar to data visualization module 428 discussed previously with respect to FIGS. 1 and 4. The data capture module 804 may include a command module 806 similar to one or more of the command modules 106, 406 and a storing module 808 similar to one or more of the storing modules 108, 408 discussed previously with respect to FIGS. 1 and 4. The data visualization module 828 may include an analysis module 830 similar to the analysis module 430 and a display module 832 similar to the display module 432 discussed previously with respect to FIG. 4.

The computing device 802 may be coupled to a storage device 810. The storage device 810 may be similar to one or more of the storage devices 110, 410 as discussed previously with respect to FIGS. 1 and 4. In some configurations, the storage device 810 may be external to the testing device 812. For example, the storage device 810 may be external to the testing device 812 to provide ample storage for captured physical layer signal data. The storage device 810 may be coupled to the testing device 812 (over a network, through a USB connection, etc., for example).

Figure 9:
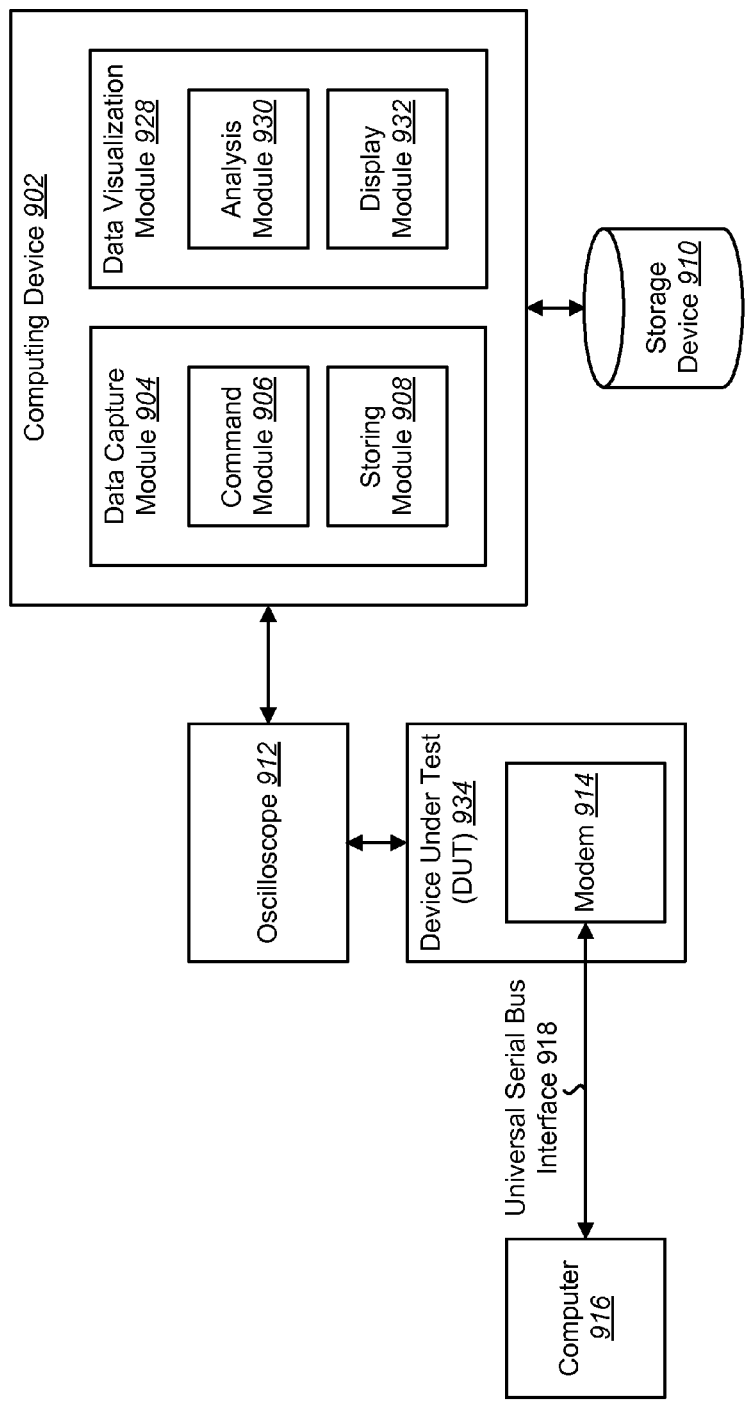
FIG. 9 is a block diagram illustrating one example of a computing device in which systems and methods for indicating a physical layer error may be implemented.

FIG. 9 is a block diagram illustrating one example of a computing device 902 in which systems and methods for indicating a physical layer error may be implemented. A computing device 902 may communicate with an oscilloscope 912. In one example, the oscilloscope 912 may capture high bandwidth analog signals (e.g., physical layer signals) in an analog capture mode. The oscilloscope 912 may be similar to one or more of the testing devices 112, 412, 812 discussed previously with respect to FIGS. 1, 4 and 8.

The oscilloscope 912 may be coupled to a device under test (DUT) 934. In one configuration (as illustrated in FIG. 9, for example), the DUT 934 may be a modem 914 (e.g., Mobile Station Modem (MSM)). The modem 914 may be similar to one or more of the first electronic devices 114, 314, 414, 814 discussed previously with respect to FIGS. 1, 3, 4 and 8. In one configuration, the modem 914 may connect to a network (e.g., cellular, Wi-Fi, etc.). In one configuration, the modem 914 may provide a computer 916 (or any other device, for example) with access to the network. For example, the modem 914 may provide the computer 916 with access to the network through a USB interface 918 (e.g., USB 2.0, USB 3.0, etc.). The USB interface 918 may be similar to one or more of the communications interfaces 118, 318, 418, 818 discussed previously with respect to FIGS. 1, 3, 4 and 8. The computer 916 may be similar to one or more of the second electronic device 116, 316, 416, 816 discussed previously with respect to FIGS. 1, 3, 4 and 8.

The computing device 902 may be similar to one or more of the computing devices 102, 402, 802 discussed previously with respect to FIGS. 1, 4 and 8. For example, the computing device 902 may include a data capture module 904 similar to one or more of the data capture modules 104, 404, 804 and a data visualization module 928 similar to one or more of the data visualization modules 428, 828 discussed previously with respect to FIGS. 1, 4 and 8. The data capture module 904 may include a command module 906 similar to one or more of the command modules 106, 406, 806 and a storing module 908 similar to one or more of the storing modules 108, 408, 808 discussed previously with respect to FIGS. 1, 4 and 8. The data visualization module 928 may include an analysis module 930 similar to one or more of the analysis modules 430, 830 and a display module 932 similar to one or more of the display modules 432, 832 discussed previously with respect to FIGS. 4 and 8. The computing device 902 may be coupled to a storage device 910. The storage device 910 may be similar to one or more of the storage devices 110, 410, 810 discussed previously with respect to FIGS. 1, 4 and 8.

Figure 10:
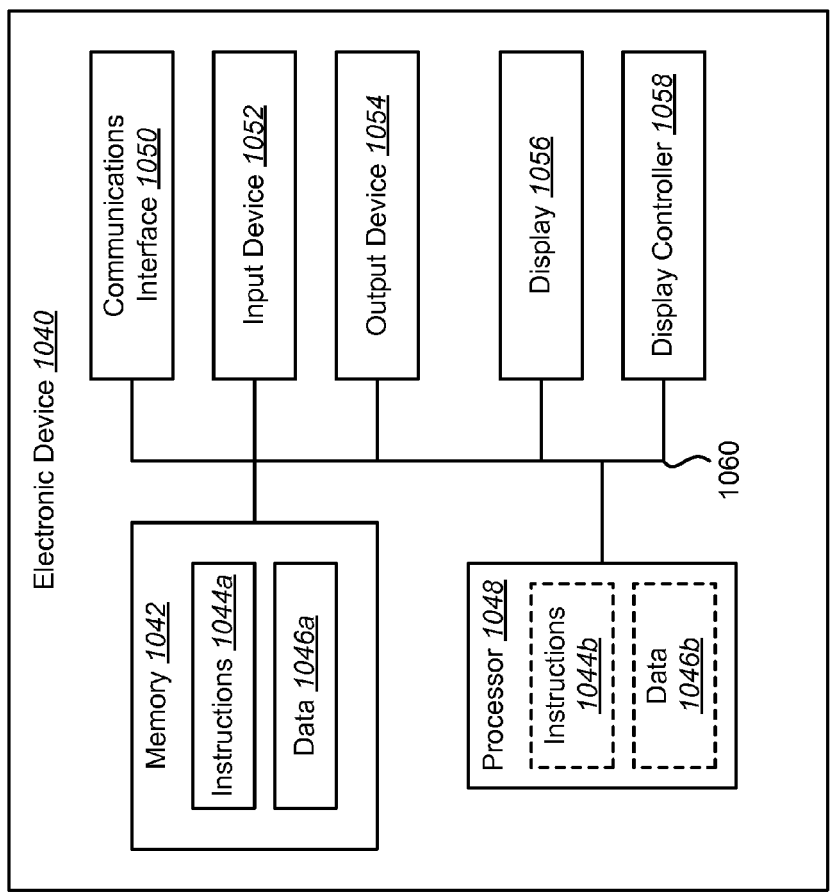
FIG. 10 illustrates various components that may be utilized in an electronic device.

FIG. 10 illustrates various components that may be utilized in an electronic device 1040. The illustrated components may be located within the same physical structure or in separate housings or structures. Examples of electronic devices 1040 may include cellular phones, smartphones, computers, televisions, etc. The electronic device 1040 may be configured similarly to one or more of the electronic devices 114, 116, 314, 316, 414, 416, 814, 816, 914, 916 and/or one or more of the computing devices 102, 402, 802, 902 described previously. The electronic device 1040 includes a processor 1048. The processor 1048 may be a general purpose single- or multi-chip microprocessor (e.g., an ARM), a special purpose microprocessor (e.g., a digital signal processor (DSP)), a microcontroller, a programmable gate array, etc. The processor 1048 may be referred to as a central processing unit (CPU). Although just a single processor 1048 is shown in the electronic device 1040 of FIG. 10, in an alternative configuration, a combination of processors (e.g., an ARM and DSP) could be used.

The electronic device 1040 also includes memory 1042 in electronic communication with the processor 1048. That is, the processor 1048 can read information from and/or write information to the memory 1042. The memory 1042 may be any electronic component capable of storing electronic information. The memory 1042 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1046a and instructions 1044a may be stored in the memory 1042. The instructions 1044a may include one or more programs, routines, sub-routines, functions, procedures, etc. The instructions 1044a may include a single computer-readable statement or many computer-readable statements. The instructions 1044a may be executable by the processor 1048 to implement one or more of the methods 200, 500, 600, 700 described above. Executing the instructions 1044a may involve the use of the data 1046a that is stored in the memory 1042. FIG. 10 shows some instructions 1044b and data 1046b being loaded into the processor 1048 (which may come from instructions 1044a and data 1046a).

The electronic device 1040 may also include one or more communications interfaces 1050 for communicating with other electronic devices. In some configurations, the communications interface 1050 may be similar to one or more of the communications interfaces 118, 318, 418, 818, 918 discussed previously. The communications interfaces 1050 may be based on wired communication technology, wireless communication technology, or both. Examples of different types of communications interfaces 1050 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, an IEEE 802.11 wireless communication adapter and so forth.

The electronic device 1040 may also include one or more input devices 1052 and one or more output devices 1054. Examples of different kinds of input devices 1052 include a keyboard, mouse, microphone, remote control device, button, joystick, trackball, touchpad, lightpen, etc. Examples of different kinds of output devices 1054 include a speaker, printer, etc. One specific type of output device which may be typically included in an electronic device 1040 is a display device 1056. Display devices 1056 used with configurations disclosed herein may utilize any suitable image projection technology, such as a cathode ray tube (CRT), liquid crystal display (LCD), light-emitting diode (LED), gas plasma, electroluminescence, or the like. A display controller 1058 may also be provided, for converting data stored in the memory 1042 into text, graphics, and/or moving images (as appropriate) shown on the display device 1056.

The various components of the electronic device 1040 may be coupled together by one or more buses, which may include a power bus, a control signal bus, a status signal bus, a data bus, etc. For simplicity, the various buses are illustrated in FIG. 10 as a bus system 1060. It should be noted that FIG. 10 illustrates only one possible configuration of an electronic device 1040. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device for indicating a physical layer error, comprising:
    a processor;
    memory in electronic communication with the processor;
    instructions stored in memory, the instructions being executable to:
        generate a command for a testing device, wherein the command comprises a directive to capture at least one physical layer signal corresponding to a communications interface between a first electronic device and a second electronic device;
        obtain data representing the at least one physical layer signal, wherein the at least one physical layer signal comprises at least one of the group consisting of a positive data signal (D+), a negative data signal (D−), a common collector voltage (VCC) and a clock signal (CLK); and
        store the data in a storage device to obtain stored data, wherein the stored data indicates any physical layer error.

2. The computing device of claim 1, wherein the instructions are further executable to:
    analyze the stored data for debugging at least one of the first electronic device and the second electronic device; and
    display the stored data for visual analysis.

3. The computing device of claim 2, wherein displaying the stored data for visual analysis comprises:
    reading a directory with a plurality of files that contain the stored data;
    displaying a plot based on the stored data;
    generating a micro-view based on the plot; and
    displaying the micro-view.

4. The computing device of claim 1, wherein obtaining data representing the at least one physical layer signal comprises:
    identifying one or more enabled channels for the testing device;
    saving a channel legend to a string for each of the one or more enabled channels;
    identifying a directory for saving data;
    obtaining one or more parameters comprising at least one of scale and trigger level;
    determining whether an end condition has occurred, and if an end condition has occurred, then ending, and if an end condition has not occurred, then:
    saving channel data to a file if the testing device is in a stop state; and
    setting the testing device to be in a run state if the testing device is in the stop state.

5. The computing device of claim 1, wherein the testing device comprises an oscilloscope.

6. The computing device of claim 1, wherein the at least one physical layer signal comprises an analog signal.

7. The computing device of claim 6, wherein the analog signal is a real-time bit-level signal.

8. The computing device of claim 1, wherein the first electronic device comprises a computer and the second electronic device comprises a data modem.

9. The computing device of claim 1, wherein the communications interface comprises a Universal Serial Bus interface.

10. The computing device of claim 1, wherein the command comprises a machine control command.

11. The computing device of claim 1, wherein the physical layer error is not analyzable by analyzing any higher layers.

12. A method for indicating a physical layer error on a computing device, comprising:
    generating a command for a testing device, wherein the command comprises a directive to capture at least one physical layer signal corresponding to a communications interface between a first electronic device and a second electronic device;
    obtaining data representing the at least one physical layer signal, wherein the at least one physical layer signal comprises at least one of the group consisting of a positive data signal (D+), a negative data signal (D−), a common collector voltage (VCC) and a clock signal (CLK); and
    storing the data in a storage device to obtain stored data, wherein the stored data indicates any physical layer error.

13. The method of claim 12, further comprising:
    analyzing the stored data for debugging at least one of the first electronic device and the second electronic device; and
    displaying the stored data for visual analysis.

14. The method of claim 13, wherein displaying the stored data for visual analysis comprises:
    reading a directory with a plurality of files that contain the stored data;
    displaying a plot based on the stored data;
    generating a micro-view based on the plot; and
    displaying the micro-view.

15. The method of claim 12, obtaining data representing the at least one physical layer signal comprises:
    identifying one or more enabled channels for the testing device;
    saving a channel legend to a string for each of the one or more enabled channels;
    identifying a directory for saving data;
    obtaining one or more parameters comprising at least one of scale and trigger level;
    determining whether an end condition has occurred, and if an end condition has occurred, then ending, and if an end condition has not occurred, then:
    saving channel data to a file if the testing device is in a stop state; and
    setting the testing device to be in a run state if the testing device is in the stop state.

16. The method of claim 12, wherein the testing device comprises an oscilloscope.

17. The method of claim 12, wherein the at least one physical layer signal comprises an analog signal.

18. The method of claim 17, wherein the analog signal is a real-time bit-level signal.

19. The method of claim 12, wherein the first electronic device comprises a computer and the second electronic device comprises a data modem.

20. The method of claim 12, wherein the communications interface comprises a Universal Serial Bus interface.

21. The method of claim 12, wherein the command comprises a machine control command.

22. The method of claim 12, wherein the physical layer error is not analyzable by analyzing any higher layers.

23. An apparatus for indicating a physical layer error, comprising:
    means for generating a command for a testing device, wherein the command comprises a directive to capture at least one physical layer signal corresponding to a communications interface between a first electronic device and a second electronic device;

means for obtaining data representing the at least one physical layer signal, wherein the at least one physical layer signal comprises at least one of the group consisting of a positive data signal (D+), a negative data signal (D−), a common collector voltage (VCC) and a clock signal (CLK); and means for storing the data in a storage device to obtain stored data, wherein the stored data indicates any physical layer error.

24. The apparatus of claim 23, further comprising:

means for analyzing the stored data for debugging at least one of the first electronic device and the second electronic device; and means for displaying the stored data for visual analysis.

25. The apparatus of claim 23, wherein the means for obtaining data representing on physical layer signal comprises:

means for identifying one or more enabled channels for the testing device;

means for saving a channel legend to a string for each of the one or more enabled channels;

means for identifying a directory for saving data;

means for obtaining one or more parameters comprising at least one of scale and trigger level;

means for determining whether an end condition has occurred, and if an end condition has occurred, then ending, and if an end condition has not occurred, then:

means for saving channel data to a file if the testing device is in a stop state; and means for setting the testing device to be in a run state if the testing device is in the stop state.

26. The apparatus of claim 24, wherein the means for displaying the stored data for visual analysis comprises:

means for reading a directory with a plurality of files that contain the stored data;

means for displaying a plot based on the stored data;

means for generating a micro-view based on the plot; and means for displaying the micro-view.

27. The apparatus of claim 23, wherein the testing device comprises an oscilloscope.

28. The apparatus of claim 23, wherein the at least one physical layer signal comprises an analog signal.

29. The apparatus of claim 28, wherein the analog signal is a real-time bit-level signal.

30. The apparatus of claim 23, wherein the first electronic device comprises a computer and the second electronic device comprises a data modem.

31. The apparatus of claim 23, wherein the communications interface comprises a Universal Serial Bus interface.

32. The apparatus of claim 23, wherein the command comprises a machine control command.

33. The apparatus of claim 23, wherein the physical layer error is not analyzable by analyzing any higher layers.

34. A computer-program product for indicating a physical layer error, comprising:

code for causing a computing device to generate a command for a testing device, wherein the command comprises a directive to capture at least one physical layer signal corresponding to a communications interface between a first electronic device and a second electronic device;

code for causing the computing device to obtain data representing the at least one physical layer signal, wherein the at least one physical layer signal comprises at least one of the group consisting of a positive data signal (D+), a negative data signal (D−), a common collector voltage (VCC) and a clock signal (CLK); and code for causing the computing device to store the data in a storage device to obtain stored data, wherein the stored data indicates any physical layer error.

35. The computer-program product of claim 34, further comprising:

code for causing the computing device to analyze the stored data for debugging at least one of the first electronic device and the second electronic device; and code for causing the computing device to display the stored data for visual analysis.

36. The computer-program product of claim 34, wherein the code for causing the computing device to obtain data representing the at least one physical layer signal comprises:

code for causing the computing device to identify one or more enabled channels for the testing device;

code for causing the computing device to save a channel legend to a string for each of the one or more enabled channels;

code for causing the computing device to identify a directory for saving data; and code for causing the computing device to obtain one or more parameters comprising at least one of scale and trigger level;

code for causing the computing device to determine whether an end condition has occurred, and if an end condition has occurred, then ending, and if an end condition has not occurred, then:

code for causing the computing device to save channel data to a file if the testing device is in a stop state; and code for causing the computing device to set the testing device to be in a run state if the testing device is in the stop state.

37. The computer-program product of claim 35, wherein the code for causing the computing device to display the stored data for visual analysis comprises:

code for causing the computing device to read a directory with a plurality of files that contain the stored data;

code for causing the computing device to display a plot based on the stored data;

code for causing the computing device to generate a micro-view based on the plot; and code for causing the computing device to display the micro-view.

38. The computer-program product of claim 34, wherein the testing device comprises an oscilloscope.

39. The computer-program product of claim 34, wherein the at least one physical layer signal comprises an analog signal.

40. The computer-program product of claim 39, wherein the analog signal is a real-time bit-level signal.

41. The computer-program product of claim 34, wherein the first electronic device comprises a computer and the second electronic device comprises a data modem.

42. The computer-program product of claim 34, wherein the communications interface comprises a Universal Serial Bus interface.

43. The computer-program product of claim 34, wherein the command comprises a machine control command.

44. The computer-program product of claim 34, wherein the physical layer error is not analyzable by analyzing any higher layers.

* * * * *